(12) United States Patent
Stummer et al.

(10) Patent No.: US 10,544,774 B2
(45) Date of Patent: Jan. 28, 2020

(54) RUNNER FOR A HYDRAULIC TURBINE OR PUMP AND METHOD OF OPERATING SUCH A RUNNER

(71) Applicant: VOITH PATENT GMBH, Heidenheim (DE)

(72) Inventors: Manfred Stummer, Heidenheim (DE); Stuart Coulson, Steven Valleys, PA (US); Jason Foust, Jacobus, PA (US)

(73) Assignee: Voith Patent GmbH, Heidenheim (DE)

( * ) Notice: Subject to any disclaimer, the term of this patent is extended or adjusted under 35 U.S.C. 154(b) by 24 days.

(21) Appl. No.: 16/060,431

(22) PCT Filed: Dec. 23, 2015

(86) PCT No.: PCT/EP2015/081103
§ 371 (c)(1),
(2) Date: Jun. 8, 2018

(87) PCT Pub. No.: WO2017/108120
PCT Pub. Date: Jun. 29, 2017

(65) Prior Publication Data
US 2018/0363465 A1    Dec. 20, 2018

(51) Int. Cl.
*F03B 3/12*    (2006.01)
*F03B 11/00*    (2006.01)

(52) U.S. Cl.
CPC ............ *F03B 11/002* (2013.01); *F03B 3/121* (2013.01); *F03B 3/125* (2013.01)

(58) Field of Classification Search
CPC .. F03B 3/06; F03B 3/121; F03B 3/125; F04D 29/181
See application file for complete search history.

(56) References Cited

U.S. PATENT DOCUMENTS

| | | | | |
|---|---|---|---|---|
| 3,132,839 A | * | 5/1964 | Haekal | F03B 3/06 415/1 |
| 5,823,740 A | * | 10/1998 | Cybularz | F03B 3/02 415/115 |
| 5,924,842 A | * | 7/1999 | Beyer | F03B 3/125 415/115 |
| 6,155,783 A | * | 12/2000 | Beyer | F03B 3/02 29/469.5 |
| 8,591,175 B2 | * | 11/2013 | Mazzouji | F03B 1/04 415/115 |

FOREIGN PATENT DOCUMENTS

| | | |
|---|---|---|
| FR | 2707974 A1 | 1/1995 |
| JP | 2007218099 A | 8/2007 |

* cited by examiner

*Primary Examiner* — Woody A Lee, Jr.
(74) *Attorney, Agent, or Firm* — Laurence A. Greenberg; Werner H. Stemer; Ralph E. Locher

(57) ABSTRACT

A runner for a hydraulic turbine or pump has a plurality of blades. Each of the blades is defined by a pressure surface, an oppositely facing suction surface, a leading edge and a spaced-apart trailing edge. At least one of the blades has a device for supplying a flow of oxygen containing gas to the trailing edge of the same blade. The device includes at least two separate gas inlet apertures and at least two separate gas passages, each extending from one of the separate gas inlet apertures to a separate group of orifices in the trailing edge of the same blade. Each of the separate group of orifices has at least one orifice to admit gas out of the corresponding separate gas passage to the passing fluid during the operation of the runner.

13 Claims, 3 Drawing Sheets

US 10,544,774 B2

RUNNER FOR A HYDRAULIC TURBINE OR PUMP AND METHOD OF OPERATING SUCH A RUNNER

BACKGROUND OF THE INVENTION

Field of the Invention

The present invention relates generally to hydroelectric turbine or pump installations. More particularly, this invention pertains to hydroelectric installations with means for enhancing the level of dissolved gas in water passing through the turbine or pump.

A significant environmental problem for many hydroelectric facilities is the water quality of discharges. Various attempts have been made to enhance the level of dissolved oxygen in discharged water of hydroelectric installations. For example, U.S. Pat. No. 5,924,842 to Beyer, James R. discloses a runner for a Francis turbine comprising a crown; a band substantially concentric with the crown; and a plurality of blades extending between crown and the band at spaced intervals along the crown, each blade fixedly secured to the crown at an inner edge and to the band at a distal outer edge, each blade having a water directing surface defined by a pressure side, an opposite facing suction side, a leading edge and a spaced apart trailing edge, at least one of the blades including: a leading edge blade portion having a rear edge in which a first slot is machined along at least a portion of the rear edge; a trailing portion having a front edge in which a second slot is machined along at least a portion of the front edge; wherein the trailing portion is fixedly secured to the leading blade portion along the front edge and the rear edge, respectively, so that the first and second channels cooperate to form an integral passage in the at least one of the blades; and means for discharging an oxygen containing gas from the integral passage to a location adjacent the trailing edge.

SUMMARY OF THE INVENTION

The objective of the mentioned state of the art is to increase the level of dissolved oxygen downstream of the turbine or pump by introducing an oxygen containing gas into the water passing through the unit. It has been documented through field testing that turbine or pump aeration lowers operating efficiency and the optimization of these aeration induced efficiency impacts often constitute design criteria for modern turbine or pump aeration technologies. A related aspect of the problem is the ability to discharge the oxygen containing gas efficiently across a wide range of operating conditions. Current hydraulic turbines or pumps are operated across a range of inlet pressures, outlet pressures, and flows, resulting in changes in the pressure distribution at the outlet of the runner. As the pressure distribution changes along the trailing edge of the blade due to changes in operating conditions, the location of the lowest pressure region also changes. With the current state of the art, a common manifold is used for all aeration slots within a given blade trailing edge. For some operating conditions, the state of the art design configuration then becomes less effective at raising dissolved oxygen levels downstream and can result in suboptimal aeration induced operating efficiency losses.

The present invention provide a runner of a hydraulic turbine or pump which is capable of maintaining high levels of dissolved oxygen over a broad range of operation modes. The inventors recognized that a runner according to prior art has only two parameters to manipulate the dissolved oxygen content downstream of the runner: The arrangement of the orifices at the trailing edge of the blade and the flow of gas through the passage. It is clear that the effectiveness of the first parameter is sensitive to the pressure distribution on the trailing edge as it is desirable to locate the orifices in the trailing edge in lowest pressure regions. The oxygen containing gas is typically admitted naturally (at atmospheric pressure), and so the maximum flow of oxygen containing gas is dependent on the average pressure downstream of the trailing edge orifices. As this average pressure rises, less oxygen containing gas can be entrained. The arrangement of the orifices corresponding to the current state of the art is fixed and can therefore only be optimized for a limited range of operation. For other modes, the increase in the dissolved oxygen level downstream will not be optimal and could require a forced flow of oxygen containing gas via blowers or compressors in order to obtain the desired dissolved oxygen levels downstream.

The problem is solved by a runner according to claim 1. Other favorable implementations of the invention are disclosed in the depended claims. The independent method claim discloses a method for operating a runner according to the present invention.

The inventors have recognized that the problem can be solved by introducing at least two separate gas passages each leading from a separate gas inlet aperture to a separate group of gas admission orifices on the runner blade. Each of the separate groups of orifices on the trailing edge comprises at least one orifice to admit gas to the passing fluid. In this way each of the separate groups of orifices on the trailing edge can be provided with a gas supply that can be regulated separately. By increasing the number of groups of separate gas orifices, the flexibility of the oxygen distribution along the trailing edge is increased. In this way, the separate groups of orifices can take best advantage of the average pressures downstream of their respective portion of the trailing edge and the dissolved oxygen can be maintained on a high level for a broad band of operation modes by adapting the gas flow through the separate passages to the respective operation mode conditions. Independent control of the gas flow rates through the separate groups of orifices depending on operation mode also provides the ability to optimize aeration induced operating efficiency impacts. It is clear that the used phrase 'separate' has the meaning of 'not fluidly connected within the blade'.

The invention will hereinafter be described in conjunction with the appended drawings:

DESCRIPTION OF THE INVENTION

Figure 1:
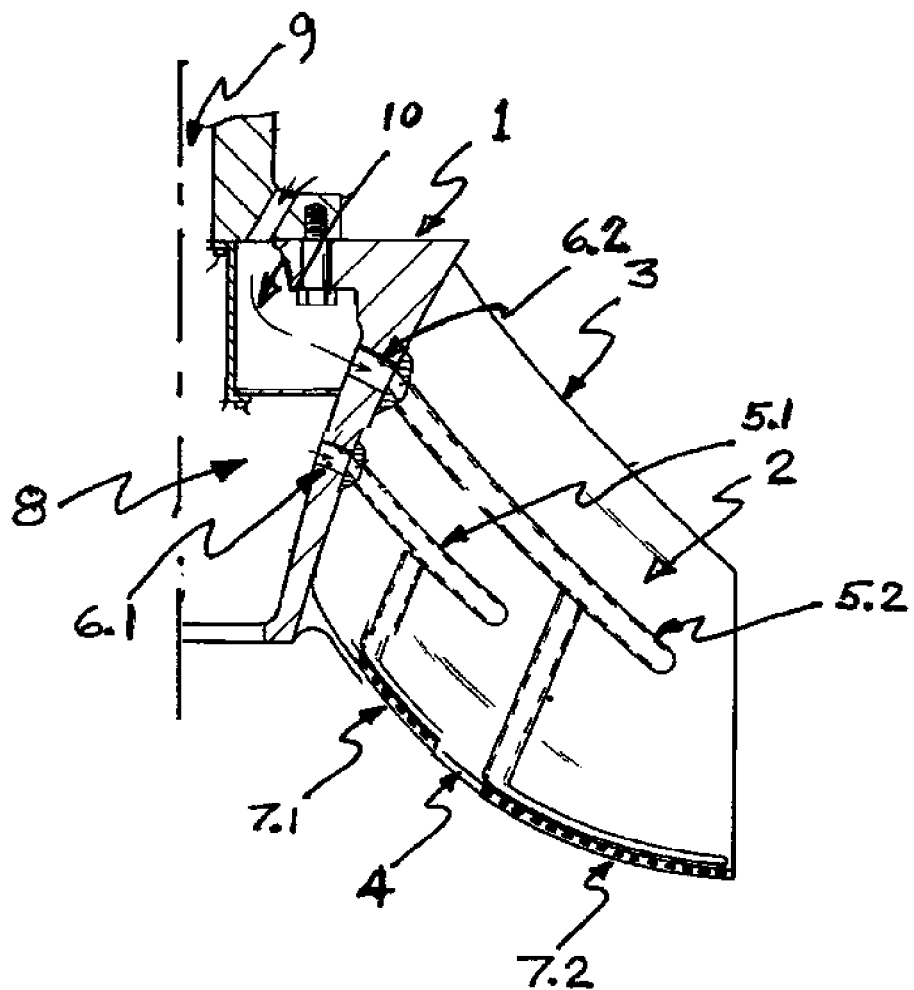
FIG. 1 is a cross-sectional view of an axial turbine runner according to an embodiment of a runner of the present invention.

FIG. 1 displays schematically a cross-sectional view of an axial turbine runner. The runner hub is designated as 1 (only the right side is shown completely). A runner blade designated as 2 extends from the hub 1. The blade 2 has a leading edge 3 and a trailing edge 4 meaning that the fluid entering the runner flows from the leading edge 3 towards the trailing edge 4. The fluid flow is divided by the blade 2 whereas one side of the blade 2 forms the pressure surface and the other side the suction surface. The blade 2 shown in FIG. 1 contains two separate chambers which are not fluidly connected. The chambers within the two surfaces of the blade 2 are designated as 5.1 and 5.2 respectively. In the region of the hub 1, the blade 2 has two separate gas inlet apertures designated as 6.1 and 6.2 each with a separate gas supply. At the trailing edge 4, there are two groups of orifices (indicated as small channels but not individually designated). These groups of orifices are designated as 7.1 and 7.2 respectively. The chambers 5.1 and 5.2 are forming separate gas passages capable of delivering oxygen containing gas from the separate gas inlet apertures 6.1 and 6.2 to the separate groups of orifices 7.1 and 7.2. The gas flowing in through the gas inlet apertures 6.1 and 6.2 is admitted through the separate groups of orifices 7.1 and 7.2 within the trailing edge 4 into the fluid i.e. water passing the trailing edge 4. The gas inlet aperture 6.2 is connected to a hub manifold (10) which is capturing the surrounding oxygen containing gas above the hub 1 of the runner during operation. On the other side the gas is sucked by the fluid passing the portion 7.2 of the trailing edge out of the gas passage 5.2. Therefore the gas flow (which contains oxygen) through the gas passage 5.2 is dependent on the operation conditions (mainly fluid pressure and fluid velocity at the portion 7.2 of the trailing edge 4). The gas flow through the gas passage 5.1 is established via the hollow inner hub chamber 8 and the hollow shaft designated as 9. The flow of gas through inlet apertures 6.1 and 6.2 can also be controlled by means not shown in FIG. 1. Therefore the amount of gas being introduced into the passing fluid at the portion 7.1 or 7.2 of the trailing edge 4 can be independently increased or decreased depending on the operation mode of the turbine. In this way, the flow and distribution of oxygen containing gas can be optimized to achieve the desired level of dissolved oxygen downstream with the minimum impact on turbine performance.

Figure 2:
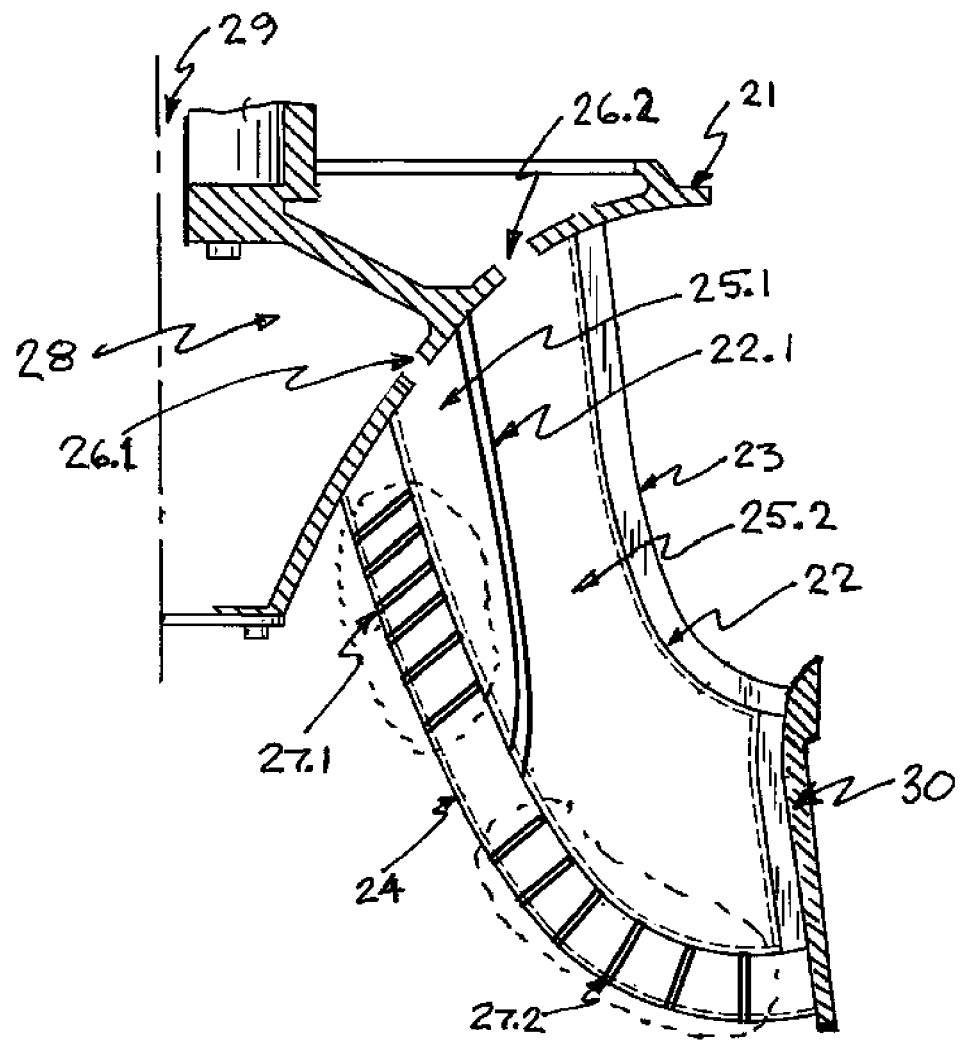
FIG. 2 is a cross-sectional view of a Francis turbine runner according to another embodiment of a runner of the present invention.

In a different embodiment of the invention, FIG. 2 displays schematically a cross-sectional view of a Francis turbine runner. The runner crown is designated as 21 (only the right side is shown completely). A runner blade designated as 22 extends between the crown 21 and the band designated as 30. The blade 22 has a leading edge 23 and a trailing edge 24 meaning that the fluid entering the runner flows from the leading edge 23 towards the trailing edge 24. The water flow is divided by the blade 22 whereas one side of the blade 22 forms the pressure surface and the other side the suction surface. The blade 22 shown in FIG. 2 is a hollow blade. The chamber between the two surfaces of the blade 22 is divided by a wall designated as 22.1 forming two separate chambers designated as 25.1 and 25.2 respectively. In the region of the inner crown chamber 28 the blade 22 has a gas inlet aperture designated as 26.1. In the region of the crown 21 the blade 22 has a gas inlet aperture designated as 26.2. At the trailing edge 24 there are two groups of orifices (indicated as small channels but not individually designated). These groups of orifices are designated as 27.1 and 27.2 respectively. The chambers 25.1 and 25.2 are forming separate gas passages capable of delivering oxygen containing gas from the separate gas inlet apertures 26.1 and 26.2 to the separate groups of orifices 27.1 and 27.2. The gas flowing in through the gas inlet apertures 26.1 and 26.2 is admitted through the separate groups of orifices 27.1 and 27.2 within the trailing edge 24 into the fluid passing the trailing edge 24. The gas inlet aperture 26.2 admits gas from above the crown 21 of the runner during operation. On the other side the gas is sucked by the fluid passing out of the group of orifices 27.2 in the trailing edge from the gas passage 25.2. Therefore the gas flow (which contains oxygen) through the gas passage 25.2 is given directly by the operation conditions (mainly fluid pressure and fluid velocity in the vicinity of the group of orifices 27.2). The gas flow through the gas passage 25.1 is established via the hollow inner crown chamber 28 and the hollow shaft designated as 29. This flow of gas can easily be controlled by means not shown in FIG. 2. Therefore the amount of gas being introduced into the passing fluid through the group of orifices 27.1 of the trailing edge 24 can be increased or decreased depending on the operation mode of the turbine. In this way, the flow and distribution of oxygen containing gas can be optimized to achieve the desired level of dissolved oxygen downstream with the minimum impact on turbine performance compared with a runner having only one gas passage.

It is clear that the embodiments shown in FIGS. 1 and 2 are only two examples of a much broader variety of embodiments each employing the inventive idea. For example one or more of the gas inlet apertures could be also located at the band 30. Or the wall 22.1 could be made in a way that its upper side ends in the inner crown chamber 28 region giving the possibility that both gas inlet apertures 26.1 and 26.2 are located in the inner crown chamber 28. In this case a gas manifold could be located within the inner crown chamber 28 to control the gas flows into the two gas inlet apertures 26.1 and 26.2 separately. Another possibility would be to connect the separate gas inlet apertures 26.1 and 26.2 by separate gas tubes leading both through the hollow shaft 29. In this case the gas manifold can be located outside the runner. It is also clear that the number of separate gas inlet apertures, the number of separate gas passages and the number of separate groups of orifices (27.1, 27.2) can be increased to achieve an even greater level of control over the flow of oxygen containing gas. It is also clear that the invention is not restricted to hollow blades where the separate gas passages are formed by a wall between the two surfaces of the blade. Within solid blades the separate gas passages can be formed by milling or drilling or other suited forming processes. The blades can also be formed by combining hollow parts with solid parts, e.g. the part near the trailing edge 4, 24 being made out of a solid part and the rest of the blade being hollow. In this latter case the separate gas passages can be located in the solid part alone.

Operating two adjacent groups of orifices of one blade at different gas flow levels may result in a step within the distribution of gas admitted to the fluid along the trailing edge of this blade. Due to the rotation of the runner such steps transfer themselves into the overall 3-dimensional distribution of gas admitted to the fluid. Of course such steps are an indication that the distribution is somewhat away from an optimal distribution. Such steps can be smoothened out in different ways. One way is as mentioned to increase the number of separate groups of orifices and of the corresponding passages within each blade resulting in many small steps coming close to the ideal distribution. Another way is to locate the separate groups of orifices differently on each of the different blades of the runner. In this way the distributions of gas due to each blade will have steps on different locations, and due to the rotation of the runner these steps will be smoothen out resulting in a smoother overall 3-dimensional distribution of gas admitted to the fluid.

The invention is also not restricted to turbines and pumps of the Francis type, or fixed blade axial turbines and pumps, but extends also to axial flow Kaplan turbines and pumps of the Kaplan type.

Figure 3:
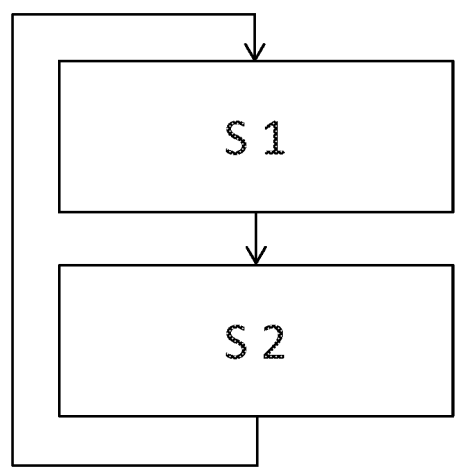
FIG. 3 shows a block diagram of the method for operating a runner according the present invention.

FIG. 3 depicts a block diagram showing the method of operating a runner according to the present invention. In step 1 (S 1) the operating condition of the turbine or pump is adjusted. In step 2 (S 2) the flow of the oxygen containing gas through at least one of the separate gas passages is adjusted according to the operating condition adjusted in step 1 in order to achieve the target dissolved oxygen content downstream with the minimum impact on performance. In practice the two steps can be done simultaneously.

In principle any oxygen containing gas can be used, for instance air or pure oxygen.

The invention claimed is:

1. A runner for a hydraulic turbine or pump, the runner comprising:
   a plurality of blades each having a pressure surface, an oppositely facing suction surface, a leading edge and a trailing edge spaced apart from said leading edge;
   at least one of said blades having a configuration for supplying a flow of oxygen-containing gas to said trailing edge of said at least one blade;
   said configuration including at least two separate gas inlet apertures and at least two separate gas passages, each extending from a respective one of said separate gas inlet apertures to a separate group of orifices formed in said trailing edge of said at least one blade; and
   each said separate group of orifices including at least one orifice configured to admit gas out of the corresponding said separate gas passage to a passing fluid during an operation of the runner.

2. The runner according to claim 1, wherein the runner is an axial flow runner comprising a hub, and wherein said blades extend from said hub at circumferentially spaced intervals.

3. The runner according to claim 1, wherein the runner is a Francis turbine comprising a crown and a band, and wherein said blades extend from said crown to said band at circumferentially spaced intervals.

4. The runner according to claim 3, wherein at least one of said gas inlet apertures is formed within said crown.

5. The runner according to claim 3, wherein at least one of said gas inlet apertures is formed within said band.

6. The runner according to claim 2, wherein at least one of said gas inlet apertures is formed within an inner hub chamber formed in said hub.

7. The runner according to claim 2, comprising a gas manifold configured to admit oxygen-containing gas to said at least two gas inlet apertures and for separately controlling a flow of gas to each of said gas inlet apertures.

8. The runner according to claim 7, wherein said gas manifold is located within an inner hub chamber formed in said hub.

9. The runner according to claim 3, comprising a gas manifold configured admit oxygen-containing gas to said at least two gas inlet apertures and for separately controlling a flow of gas to each of said gas inlet apertures.

10. The runner according to claim 9, wherein said gas manifold is located within an inner crown chamber formed in said crown.

11. The runner according to claim 1, wherein a spatial distribution of said groups of orifices on said trailing edge is uniform between said runner blades.

12. The runner according to claim 1, wherein a spatial distribution of said groups of orifices on said trailing edge is non-uniform between said runner blades.

13. A method of operating a runner of a hydraulic turbine or pump, the method comprising:
   providing the runner according to claim 1;
   adjusting a flow of the oxygen-containing gas through at least one of the separate gas passages according to respective operating conditions of the hydraulic turbine or pump.

* * * * *